United States Patent [19]

Raedisch et al.

[11] Patent Number: 4,826,914

[45] Date of Patent: May 2, 1989

[54] TRANSPARENT COVER FOR TRANSPARENT SUBSTRATES

[75] Inventors: Helmer Raedisch; Gerhard Holzer, both of Aachen; Udo Gelderie, Stolberg; Kornelia Breuer, Aldenhoven, all of Fed. Rep. of Germany

[73] Assignee: Saint-Gobain Vitrage, Courbevoie, France

[21] Appl. No.: 105,125

[22] Filed: Oct. 6, 1987

[30] Foreign Application Priority Data

Oct. 6, 1986 [DE] Fed. Rep. of Germany ....... 3633950
Feb. 12, 1987 [DE] Fed. Rep. of Germany ....... 3704294

[51] Int. Cl.$^4$ ................................................ C08K 5/24
[52] U.S. Cl. ...................................... 524/731; 528/27; 528/28
[58] Field of Search ...................... 528/27, 28; 524/731

[56] References Cited

U.S. PATENT DOCUMENTS

| | | | |
|---|---|---|---|
| 3,846,462 | 11/1974 | Prokai et al. | 528/28 |
| 4,452,962 | 6/1984 | Ginnings et al. | 528/27 |
| 4,684,538 | 8/1987 | Klemarczyk | 528/28 |

Primary Examiner—Melvyn I. Marquis
Attorney, Agent, or Firm—Oblon, Fisher, Spivak, McClelland & Maier

[57] ABSTRACT

A transparent cover layer of a soft elastic polyurethane for windshields or other transparent glass or plastic substrates. In order to give the cover layer an anti-fogging effect, the polyol component of the reaction mixture for the manufacture of the cover layer contains a difunctional sulfonated polyether polyol or a difunctional polyether polyol containing sulfonate groups having 0.5 to 13.2 percent by weight of OH groups and an average molecular weight of about 250 to 6500 g/mol, a trifunctional polyol having 5.1 to 12.8 percent by weight of OH groups and an average molecular weight of from 400 to about 1000 g/mol, as well as a non-ionic polyetherpolysiloxane having an average molecular weight of from 500 to 2000 g/mol.

6 Claims, No Drawings

TRANSPARENT COVER FOR TRANSPARENT SUBSTRATES

BACKGROUND OF THE INVENTION

1. Field of the Invention

The invention relates to a transparent cover layer for windshields or other transparent glass or plastic substrates of soft elastic polyurethanes which is made from a reaction mixture, the isocyanate component of which contains at least one essentially trifunctional aliphatic polyisocyanate based on 1,6 hexamethylene diisocyanate with a biuret or isocyanurate structure having a content of NCO groups of from 12.6 to 28 percent by weight and an average molecular weight of about 450 to about 1000 g/mol, and the polyol component of which contains a difunctional sulfonated polyether polyol or a difunctional polyether polyol having 0.5 to 13.2 percent by weight of OH groups and an average molecular weight of about 250 to 6500 g/mol and a trifunctional polyol based on trimethylol propane and propylene oxide with a 5.1 to 12.8 percent by weight content of OH groups and an average molecular weight of about 400 to about 1000 g/mol.

2. Background of the Prior Art

Transparent soft elastic cover layers of this type are the object of the German Patent Application P 36 05 765.7. On the one hand they have the characteristics that, when subjected to common types of loads, which with harder plastics lead to superficial deformations and scratch-like impressions, they experience only an elastic deformation which disappears after a short time, and on the other hand they have the advantage that the formation of bothersome condensate fog is reduced or eliminated. The reduction or elimination of disruptive condensate fog is accomplished by means of a water-spreading effect which is achieved through the use of difunctional sulfonated or sulfonate-group-containing polyether polyols in the reaction mixture for the manufacture of the cover layers.

Soft elastic cover layers of this type can either be manufactured directly onto the underlayer to be coated by applying the appropriate surface with the reaction mixture, or it can be applied as a premanufactured foil to the underlayer to be coated. In the latter case the foils are produced through application of the reaction mixture onto a casting base, whereby the foils are pulled from the casting base after the reaction is complete, i.e. after the reaction mixture has hardened.

It has been shown that the fog-reducing characteristics of the prefinished foils can be different on the two surfaces. If, for example, the casting base is made of metal or a glass plate, then the anti-fogging effect of a foil produced on such a casting base is substantially less on the upper surface, i.e. on the surface that was exposed to the ambient atmosphere, than on the surface that was in contact with the casting base.

The object of the invention is to improve further the fog-reducing effect of the cover layers described above, particularly on the surface that is in contact with the surrounding atmosphere during the forming of the cover layers from the reaction mixture.

SUMMARY OF THE INVENTION

According to the invention, this object is achieved in that a polyoxyalkylene of 1.2 or 1.3 diolene of the formula

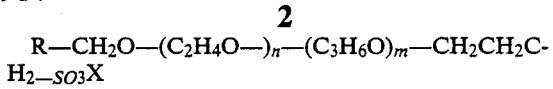

is used as the difunctional sulfonated polyether polyol or difunctional polyether polyol containing sulfonate groups, whereby
R=

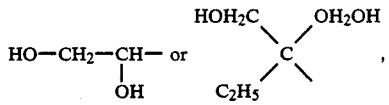

X=H, sodium or ammonium ion,
n=0 to 100,
m=0 to 30,
n+m≧1,
and in that the reaction mixture also contains a non-ionic copolymer based on polyoxyalkylene modified dimethyl polysiloxane (polyether-polysiloxane) having an average molecular weight of about 500–2000 g/mol of the general formula

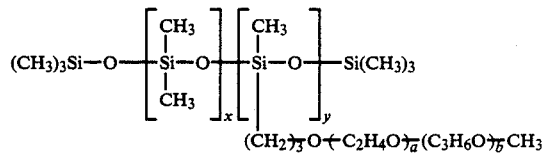

whereby the ratio x/y=5/11 to 1/1,
a=80–100 percent by weight, and
b=20–0 percent by weight.

Thus, according to the invention, on the one hand certain difunctional sulfonated polyether polyols or difunctional polyols containing sulfonate groups are used, and on the other hand certain polyether -polysiloxanes are used in addition thereto. These polyether-polysiloxanes do not form any kind of chemical bond with the polyisocyanates, but rather are stored in the cover layer and are thus physically present in the surfaces thereof as well. Together with the difunctional sulfonated or sulfonate group-containing polyether polyolene, they act on the condensed water droplets as a wetting agent and reduce the boundary surface tension between the cover layer and the water droplets. This effect may be observed equally on both surfaces of such a cover layer. The simple addition of polyether - polysiloxane alone to a reaction mixture without the simultaneous presence of sulfonated or sulfonate-group-containing polyether polyol, it has been shown, results in no observable fog-reducing effect. The desired increase in the fog-reducing effect, in contrast, results exclusively when the sulfonated or sulfonate-group-containing polyether polyol is simultaneously present, i.e. through the synergistic effect of the sulfonated or sulfonate-group-containing polyether polyol with the non-ionic polyether - polysiloxane. The cover layer in this manner acquires increased hydrophilic characteristics and a markedly improved fog-reducing effect on both surfaces, which effect is still present after the cover layer is boiled in water for ten hours. On the other hand, the addition of polyether polysiloxane does not impermissibly alter the mechanical physical characteristics of the cover layer, which rather remain fully intact to the required degree.

It is preferred that polyether-1,3-dioles with an average molecular weight of about 1300 g/mol be used as the difunctional sulfonated or sulfonate-group-containing polyether polyols. Polyether polyols of this type and methods for their manufacture are described in greater detail in DE-PS No. 34 07 563.

Further advantageous embodiments and further developments of the invention are the objects of the dependent claims and disclosed in the description of various exemplary embodiments.

DETAILED DESCRIPTION OF THE INVENTION

For the evaluation of the mechanical-physical characteristics of the soft elastic polyurethane-cover layers, the E-module, abrasion resistance and microscratching hardness are selected as representative characteristics, which in their totality permit judgment about whether the cover layer demonstrates the required self-healing characteristics and the necessary behavior in use. The E-module is determined according to the method described in DIN 53.457. The method described in the ECE standard R-43 is used to determine resistance to abrasion, whereby two abrasive friction rollers loaded at a rating of 500 g act on the rotating sample over 100 revolutions. To evaulate the amount of wear caused by this loading, the method described in the ECE standard R-43 is also used to compare the increase in the degree of opaqueness as compared to the original opaqueness before the treatment, which is given as a percentage. The micro-scratching hardness is determined by the Erichsen method, in which a testing device is used like that described in DIN 53.799, with the exception that the conical scratching diamond has a cone angle of 50 degrees and a point round radius of 15 $\mu$m at the cone point. To evaluate the scratch hardness, the highest load weight of the scratching diamond is determined at which there is still no permanent visible damage to the surface.

From past experience it is known that self-healing transparent polyurethane cover layers can be used as splinter-proof windshields if the E-module of these layers lies between 2 and 20 N/mm$^2$, the increase in opaqueness through abrasion in accordance with ECE R-43 is less than 4% and the microscratch hardness according to the Erichsen method lies above 10 p. Even hydrophilic cover layers can be used for practical long-period uses if the mentioned characteristics lie within these limits.

To evaulate the wettability of the cover layer and thereby also evaluate the fog-reducing effect, the edge angle of water droplets placed on the surface of the cover layer is measured with the aid of a goniometer microscope. On the known cover layers of soft elastic polyurethane, which have no fog-reducing effect, the size of the edge angle is 70 to 80 degrees, and on cover layers containing only a difunctional sulfonated or sulfonate-group-containing polyether polyol as a water-spreading additive, the size of the edge angle is about 45 to 80 degrees. In contrast, the size of the edge angle on cover layers modified according to the invention is sharply reduced and can even be reduced to nearly zero degrees.

Several exemplary embodiments are described below within the framework of the claimed compositions, and the measured mechanical and fog-reducing characteristics of these cover layers are related, whereby examples 1 and 2 are not cover layers according to the invention, but serve only for comparison.

EXAMPLE 1

A cover layer is produced as described in the German Patent Application P 36 05 765. For this purpose 50 g of an essentially trifunctional biuret-group-containing polyisocyanate based on 1-6-hexamethylene diisocyanate with a content of free NCO groups of 23 percent by weight, and an average molecular weight of about 550 g/mol, 50 g of a trifunctional polyol based on trimethylol having an OH content of 11 percent by weight and an average molecular weight of about 500 g/mol, as well as 5 g of a difunctional sulfonate-group-containing polyether-1,3-diol with a content of OH groups of 3.4 percent by weight and an average molecular weight of about 1000 g/mol of the first-cited formula, in which
R=

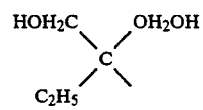

X=Sodium ion
n=16 and
m=0.

0.05 g of dibutyl tin dilaurate as a catalyst and 0.1 g of fluorinated alkylester as a leveling agent are added as additives.

The mixture is intensively mixed at room temperature for 10 minutes. The thus homogenized reaction mixture is poured in a layer thickness of 0.5 mm onto glass plates that have been heated to about 60 degrees C. The curing reaction takes place within 30 minutes at 90 degrees C.

| | |
|---|---|
| E-module | 7.3 ± 0.2 N/mm$^2$ |
| Opaqueness increase through abrasion | 4.0% |
| Microscratching hardness | 27 p |
| Edge angle (measured on the surface of the foil which was in contact with the surface of the glass surface) | 44 degrees |
| Edge angle (measured on the surface which was subjected to the ambient atmoshpere) | 80 degrees |

After 48 hours of storage at 20 degrees C. and 50% relative humidity the foils are pulled off and their characteristics are determined, whereby the following results are obtained:

The mechanical characteristics of this cover layer lie within the necessary limits. The fogging behavior is significantly improved on the surface of the foil that was in contact with the surface of the glass.

EXAMPLE 2

A cover layer is produced from a reaction mixture as described in example 1, but instead of the sulfonate-group-containing polyether-1,3-diol, 1 g of a non-ionic polyetherpolysiloxane with an average molecular weight of about 700 g/mol of the general formula first given, whereby the ratio x/y=1/1, a=100 percent by weight and b=0 percent by weight.

| | |
|---|---|
| E-module | 7.0 ± 0.2 N/mm² |
| Opaqueness increase through abrasion | 4.1% |
| Microscratching hardness | 36 p |
| Edge angle (glass side) | 50 degrees |
| Edge angle (air side) | 63 degrees |

The samples produced in this manner are also stored for 48 hours at 20 degrees C. and 50 percent relative air humidity. Subsequently, the characteristics of the cover layers are determined, whereby the following measurement values are obtained:

The mechanical characteristics of this cover layer lie within the necessary limits; the fog-reducing effect of this cover layer, however, is not satisfactory either on the side of the casting base nor on the air side.

EXAMPLE 3

To manufacture a cover layer according to the invention a reaction mixture is used to which both a difunctional sulfonategroup-containing polyether polyol is added as well as a non-ionic polyether-polysiloxane.

For this purpose 50 g of an essentially trifunctional biuret-group-containing polyisocyanate based on 1,6-hexamethylene diisocyanate with a content of free NCO groups of 23 percent by weight and an average molecular weight of about 550 g/mol, 50 g of a trifunctional polyol based on trimethylol propane with an OH content of 11 percent by weight and an average molecular weight of about 500 g/mol, 5 g of a difunctional sulfonate-groupcontaining polyether-1,3-diol with a content of OH groups of 2.6 percent by weight and an average molecular weight of about 1300 g/mol of the first mentioned formula,
in which
R=

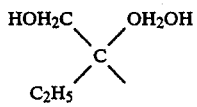

X=Sodium ion
n=23 and
m=0,
and 1 g of the polyether-polysiloxane mentioned in example 2 are mixed together. 0.05 g of dibutyl tin dilaurate as a catalyst and 1.0 g of a sterically impeded amine as a light-protective agent are added to the polyol as additives.

The mixture is intensively mixed for 10 minutes at room temperature. The thus homogenized reaction mixture is poured in a layer thickness of 0.5 mm onto glass plates that are heated to about 60 degrees C. The curing reaction takes place within 30 minutes at 90 degrees C.

After 48 hours of storage at 20 degrees C. and 50 % relative humidity the foils are pulled off and their characteristics tested, whereby the following values are found:

| | |
|---|---|
| E-module | 6.1 ± 0.4 N/mm² |
| Opaqueness increase through abrasion | 3.1% |
| Microscratching hardness | 21 p |
| Edge angle (measured on the glass side) | 30 degrees |
| Edge angle (measured on the air side) | 58 degrees |

The mechanical characteristics of this cover layer lie within the necessary limits, while simultaneously the fogging behavior is substantially improved.

EXAMPLE 4

To produce a cover layer according to the invention a reaction mixture as described in example 3 is produced, whereby, however, instead of the sulfonate-group-containing polyether-1.3-diol a difunctional sulfonic acid-group-containing polyether1,2-diol with a content of OH groups of 2.5 percent by weight and an average molecular weight of 1360 g/mol of the first-mentioned formula is used, in which
R=

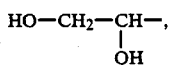

X=H⁺-ion
n=26 and
m=0.

From the reaction mixture a cured cover layer is produced in the same manner as described in example 3, on which the measurements are performed.

The following test values were found:

| | |
|---|---|
| E-module | 5.4 ± 0.4 N/mm² |
| Opaqueness increase after abrasion | 3.5% |
| Microscratching hardness | 20 p |
| Edge angle (measured on the glass side) | 35 degrees |
| Edge angle (measured on the air side) | 62 degrees |

Thus, in this case as well the mechanical characteristics lie within the cited limits, while the fogging behavior is also significantly improved.

EXAMPLE 5

A reacton mixture is produced from 50 g of the trifunctional polyisocyanate mentioned in the preceeding examples with a content of free NCO groups of 23 percent by weight and an average molecular weight of about 550 g/mol, 41 g of a trifunctional polyol based on trimethylol propane with an OH content of 11 percent by weight and an average molecular weight of about 500 g/mol, 12 g of a difunctional sulfonate-group-containing polyether-1.3-diol with a content of OH groups of 2.6 percent by weight and an average molecular weight of about 1300 g/mol of the first mentioned formula,
in which
R=

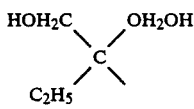

X=Sodium ion
n=23 and m=0,
and 1 g of the polyether-polysiloxane described in the examples 2 and 3. 0.05 g of dibutyl tin dilaurate as a catalyst and 1/0 g of a stericaly impeded amine as a light-protection agent are added as additives.

The samples produced in this manner are also stored for 48 hours at 20 degrees C and 50 percent relative air humidity. Subsequently, the characteristics of the cover layers are determined, whereby the following test values are obtained:

| | |
|---|---|
| E-module | 7.8 ± 0.4 N/mm$^2$ |
| Opaqueness increase after abrasion | 4.0% |
| Microscratching hardness | 26 p |
| Edge angle (measured on the glass side) | 10 degrees |
| Edge angle (measured on the air side) | 41 degrees |

Accordingly, in this instance, too, the mechanical characteristics lie within the mentioned limits, while fogging behavior is also substantially improved.

EXAMPLE 6

A reaction mixture is produced as in Example 5, whereby, however, the quantity of the polyether-polysiloxane described in detail in Example 2 is increased to 5 g. 0.05 g of dibutyl tin dilaurate as a catalyst and 1.0 g of a stericaly impeded amine as a light-protective agent are added as additives.

The mixture is intensively mixed for 10 minutes at room temperature. The thus-homogenized reaction mixture is processed into cured foils in the same manner as in the previously described examples, and the same measurements are performed thereon.

The following test values were obtained:

| | |
|---|---|
| E-module | 5.5 ± 0.8 N/mm$^2$ |
| Opaqueness increase after abrasion | 3.2% |
| Microscratching hardness | 26 p |
| Edge angle (measured on the surface of the foil that was in contact with the surface of the glass) | 0 degrees = water spreading |
| Edge angle (air side surface of the foil) | 7 degrees |

This cover layer also has characteristics making it suitable for practical use both with regard to its mechanical behavior and to its fogging behavior.

EXAMPLE 7

A reaction mixture is produced as in Example 6, whereby, however, a difunctional sulfonate-groupcontaining polyether-1,3-diol of the first-mentioned formula is used,
which
R=

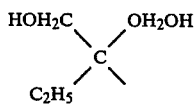

X=Sodium ion
n=14 and
m=2, and which has an average molecular weight of about 1000 g/mol, and in which in the described composition constitutes 15 percent by weight propo- and 85 percent by weight ethoxy-groups and also contains an end position $SO_3^-Na^+$- group. The quantity of this sulfonate-group-containing polyether-1,3-diol in the mixture is 12 g.

The mixture is processed into a cured cover layer as in Example 1, and the tests are performed thereon.

The tests yielded the following measurement values:

| | |
|---|---|
| E-module | 8,3 ± 0.3 N/mm$^2$ |
| Opaqueness increase after abrasion | 4.0% |
| Microscratching hardness | 20 p |
| Edge angle (measured on the surface of the foil that was in contact with the surface of the glass) | 5 degrees |
| Edge angle (air side surface of the foil) | 8 degrees |

This cover layer also exhibits characteristics which make it suitable for practical use, both with regard to its mechanical behavior and to its fogging behavior.

EXAMPLE 8

A reacton mixture is produced as described in Example 6, whereby, however, a non-ionic polyether-polysiloxane with an average molecular weight of about 1000 g/mol of the first-cited general formula is added in a quantity of 5 g. In this polyether-polysiloxane the ratio x/y=1/1, a=85 percent by weight and b=15 percent by weight.

The mixture is processed into a cured cover layer as described in example 1, and the tests are performed thereon.

The tests yielded the following measurement values:

| | |
|---|---|
| E-module | 6.3 ± 0.8 N/mm$^2$ |
| Opaqueness increase after abrasion | 3.8% |
| Microscratching hardness | 22 p |
| Edge angle (measured on the surface of the foil that was in contact with the glass surface) | 6 degrees |
| Edge angle (air side surface of the foil) | 10 degrees |

This foil also exhibits characteristics which make it suitable for practical use, both with regard to its mechanical behavior and to its fogging behavior.

EXAMPLE 9

A reaction mixture is produced as described in example 8, whereby, however, a non-ionic polyether-polysiloxane having an average molecular weight of about 1100 g/mol of the first-described general formula is used. With this polyether-polysiloxane the ratio x/y=5/1, a=100 percent by weight and b=0 percent by weight.

The mixture is processed into a cured cover layer as in Example 1, and the measurements were taken thereon.

The tests yielded the following measurement results:

| | |
|---|---|
| E-module | 5.4 ± 0.7 N/mm² |
| Opaqueness increase after abrasion | 3.9% |
| Microscratching hardness | 18 p |
| Edge angle (measured on the surface of the foil that was in contact with the surface of the glass) | 13 degrees |
| Edge angle (air side surface of the foil) | 15 degrees |

This foil also exhibits characteristics which make it suitable for practical use, both with regard to its mechanical behavior and to its fogging behavior.

Obviously, numerous modifications and variations of the present invention are possible in light of the above teachings. It is therefor to be understood that within the scope of the appended claims, the invention may be practiced otherwise than as specifically described herein.

What is claimed as new and desired to be secured by Letters Patent of the United States is:

1. A transparent cover layer for windshields or other transparent glass or plastic substrates, comprised of a layer of soft elastic polyurethane, wherein said polyurethane is produced by the process comprising:
    (I) mixing a reaction mixture comprised of
        (a) an isocyanate component comprising at least one essentially trifunctional aliphatic polyisocyanate having a biuret or isocyanurate structure and made from 1,6-hexamethylene-diisocyanate, having a content of NCO groups of from 12.6 to 28 percent by weight and an average molecular weight of about 450 to about 1000 g/mol,
        (b) a polyol component comprising
            (1) a difunctional polyetherpolyol containing a —SO₃X group having 0.5 to 13.2 percent by weight of OH groups and an average molecular weight of about 250 to 6500 g/mol and being a polyoxyalkyleneether of 1,2- or 1,3-diols having the formula:

R—CH₂O—(C₂H₄O—)$_n$—(C₃H₆O—)$_m$—CH₂CH₂ wherein:
R=

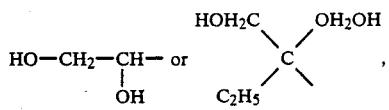

X=H, sodium or ammonium ion,
n=0 to 100,
m=0 to 30,
n+m≧1,
and
            (2) a trifunctional polyol obtained from trimethylolpropane and propylene oxide, having a content of OH groups of from about 5.1 to 12.8 percent by weight and an average molecular weight of about 400 to about 1000 g/mol, and
        (c) a non-ionic copolymer comprised of a polyoxyalkylene modified dimethylpolysiloxane having an average molecular weight of about 500 to 2000 g/mol and having the general formula:

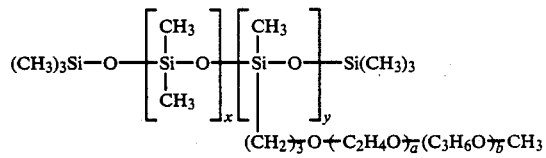

whereby the ratio x/y=5/11 to 1/1,
a=80–100 percent by weight, and
b=20–0 percent by weight
    (II) pouring said reaction mixture on a reaction support, and
    (III) heating said reaction mixture until it is substantially cured.

2. Transparent cover layer according to claim 1, wherein the amount of non-ionic copolymer in the reaction mixture is from 1 to 5 percent by weight.

3. Transparent cover layer according to claim 1, wherein the amount of difunctional polyoxyalkyleneether in the reaction mixture is from 5 to 12 percent by weight.

4. Transparent cover layer according to claim 1, wherein the non-ionic copolymer has an average molecular weight of about 1000 g/mol.

5. Transparent cover layer according to claim 1, wherein the non-ionic copolymer comprises ethoxy and propoxy groups having at least 80 percent by weight ethoxy groups in the polyether chain.

6. Transparent cover layer according to claim 1, wherein the polyether chain of the non-ionic copolymer contains 100% by weight ethoxy groups.

* * * * *